Nov. 24, 1942.   C. T. RIPLEY ET AL   2,302,892
METHOD OF MAKING SPRING PACKING
Original Filed March 8, 1941
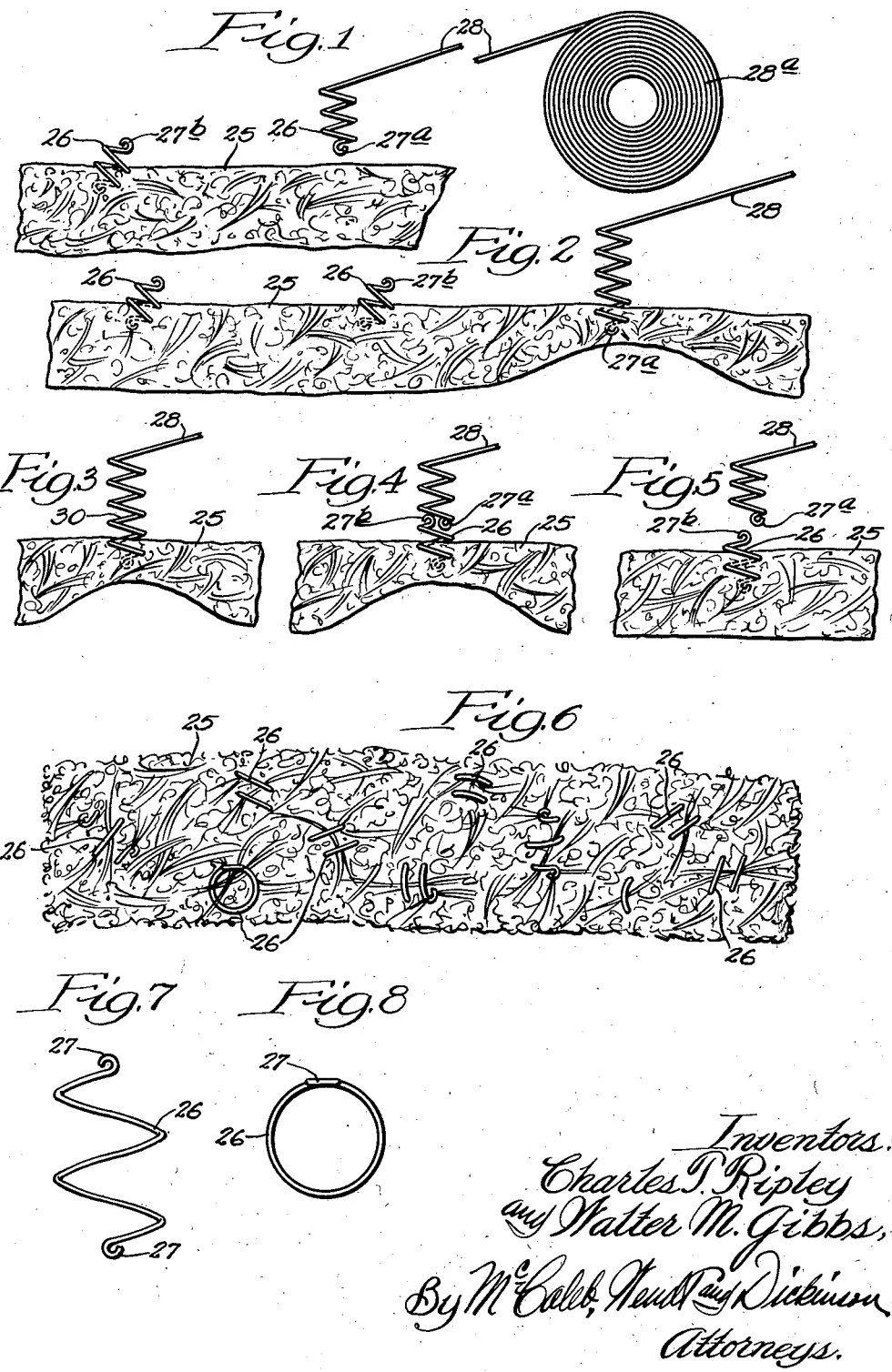

Patented Nov. 24, 1942

2,302,892

UNITED STATES PATENT OFFICE 2,302,892

METHOD OF MAKING SPRING PACKING

Charles T. Ripley and Walter M. Gibbs, Chicago, Ill., assignor to Spring Packing Corporation, Chicago, Ill., a corporation of Illinois Original application March 8, 1941, Serial No. 382,374. Divided and this application July 10, 1941, Serial No. 401,748

9 Claims. (Cl. 140—71)

Our invention relates to the manufacture of spring-filled packing—a stranded capillary material such as waste with a multiplicity of springs embedded therein. This spring-filled packing is used especially for packing the journal boxes of railway rolling stock. The compression springs which are embedded within the waste perform the two-fold function of better keeping the waste pressed against the journal surfaces and holding the waste rather open so that it does not lose too much of its capillarity by becoming packed in hard lumps.

Our present invention is concerned with an improved method of making the spring-filled packing and the springs therefor. The springs are preferably formed more or less simultaneously with the operation of embedding them in the waste.

Our improved spring-filled packing and our improved spring used therein, which are disclosed in this application, are disclosed and claimed in our copending application Serial No. 382,375, filed March 8, 1941, on "Spring-filled packing."

The present application is a division of our application Serial No. 382,374, filed March 8, 1941, on "Method and apparatus for making spring packing."

Among the objects of our new method of making the springs and embedding them in the packing are: A better control of the anchorage of the springs in the waste whereby they will be anchored effectively to the waste to keep them well distributed throughout the waste, but yet permit a ready release of the anchorage in separating the smaller body of the spring-filled waste from a larger body; an improved technique for the manufacture of the springs with terminal eyes in such a manner as to facilitate embedding the springs in the waste as an incident to or continuation of the manufacture of the springs, and which will yet provide ample working space where the terminal eyes are formed for the tools or other instrumentalities employed in forming the eyes; and an improvement in the method of cutting a terminal portion of a wire helix to sever a helical spring therefrom and while holding the cut-apart bodies of the wire helix in situ, turning back their severed ends.

The foregoing, together with further objects, features and advantages of our invention, are set forth in the following description of, and the accompanying drawing illustrating, a specific embodiment thereof. In the drawing:

Figs. 1 to 5, inclusive, are vertical views showing successive steps in the manufacture of our spring waste;

Fig. 6 is a view of a mass of the finished product;

Fig. 7 is a side elevation of a completed spring; and

Fig. 8 is a plan view of a completed spring.

Our new spring-filled waste is illustrated in Fig. 6. It is a mass of waste 25—inexpensive cotton waste will suffice—with a multiplicity of springs 26, detailed in Figs. 7 and 8, embedded therein. The waste does not have its yarns in any particular pattern or interrelationship.

The springs, as shown in Figs. 7 and 8, are helical springs which may be about an inch and a half in diameter and two convolutions long. They are made from spring brass wire to give a maximum resiliency with a minimum danger of corrosion.

The ends of the springs are formed into outwardly turned eyes 27, which, as shown in Fig. 8, lie in the cylindrical surface within which the helical body of the spring may be considered as lying. This is as distinguished from the eyes lying in planes at normals to the axis of the helix. The eyes are not entirely closed but leave openings large enough to pass strands or yarns of the waste. This enables the eyes to anchor themselves to strands of the waste and better prevent dislocation of the spring relative to the immediate mass of yarn in which it is embedded.

The ends of the wire of the springs are turned in against the adjoining helical body to protect a workman's fingers against any danger of being cut thereby, since his fingers can touch only rounded surfaces. For the same reason, there is not even danger of the surface of the journal being scratched by sharp-cornered ends of the spring wire. The rounded surfaces afforded by the eyes facilitate the threading of the springs into the waste. But, as previously mentioned, because the eyes are not entirely closed, they have a hooking action upon a very few—and only a very few—strands of waste, which largely precludes any unscrewing of the springs from the mass of waste. Although the barbs at the ends of the wire resulting from cutting the wire are shielded by the eyeing from interfering with the threading of the wires into the waste, the barbed ends are presented to some of the strands of waste once the insertion is completed, and that tends to provide an anchoring of the springs within the waste quite in addition to the hooking action.

In the ultimate product of Fig. 6, the springs are not arranged in any pattern or predetermined position, but are variously disposed; they "run every which way." The resilience of the springs being much greater axially than diametrically, when the waste is packed into a journal box, for example, the miscellaneous disposition of the springs insures that a sizable body of waste will, because of the springs, exert a resilient pressure in all directions including, most importantly of all, pressure toward the journal.

Our new method of manufacturing spring-filled waste is illustrated generally in Figs. 1 to 6. These operations are carried out in successive cycles, each cycle comprising forming another two convolutions of helix from the supply wire, severing a two-convolution helix, forming terminal eyes, and screwing a completed severed helix spring into the layer of waste.

For the beginning of such a cycle we start, as shown in Fig. 1, with a previously formed two-convolution helix of wire with a terminal eye 27a formed at the lower end thereof. The helix is disposed with its axis vertical and with the lower eye spaced above the top of a layer of the waste 25 by a distance about equal to a convolution of the helix.

The first step in the method cycle is to add two more convolutions to the helix of Fig. 1 by moving the wire longitudinally along its own axis, taking the wire from the reach of wire leading from the supply 28a. This shifting of the wire along its own axis, while retaining a fixed path for the helix, results in the previously formed portion of the helix shown in Fig. 1 being screwed downwardly along the helical path, with the eye 27a leading, so that about the lowermost convolution is threaded into the layer of waste as at the right in Fig. 2. At this time the lower side of the layer of waste is elevated in the region beneath the infed helix so that the thickness of the layer is at least locally reduced by about one-half. (Preferably the normal thickness of the layer of waste is a little more than the length of the spring.) The helix now has four convolutions, the lower of which is threaded into the compressed layer of waste.

The second step, as shown in Fig. 3, is to cut the wire at 30, severing the lower double convolution. (It is never necessary, in our process, to cut the wire between the helix and the supply reach.) The cutting leaves slight barbs at the severed ends of the wire.

The third step, as shown in Fig. 4, is to form eyes 27a and 27b in the severed ends of the wire. The new eye 27a becomes the lower eye of a future convolution helix, like the initial two-convolution helix of Fig. 1, while the eye 27b becomes the upper terminal eye of the severed new two-convolution helix. As to each eye, the eye is formed by turning the severed end of the wire in a plane tangential to the helix at that point, with the turning being axially away from the body of the helix, the terminal of which the eye defines. During the eye-forming operation of Fig. 4, the terminal reaches of wire are clamped at a spaced distance back from the cut, so that the body of the severed helix remains fixed during the eye formation. As a result, the completed eyes are spaced apart by a distance resulting from the length of wire incorporated in the eyes.

It will thus be seen that the complete formation of the completed spring of Fig. 4 from the supply wire has not been accomplished during this cycle. Instead it was formed largely during the previous cycle. That is, the two helical convolutions of the completed spring and its lower terminal eye 27a, as shown in Fig. 1, were formed during the preceding cycle; only the spring-forming steps of severing the wire and forming the upper terminal eye 27b were performed in the current cycle.

The fourth step in the cycle, as shown in Fig. 5, comprises a release of the completed spring from its positional relationship to the newly formed two-convolution helix of wire and the lowering of the bottom of the layer of waste, so that the waste will expand to its normal thickness. As it does so, the spring is pulled down into the layer of waste to a greater extent than it was initially threaded, with the result that a substantial portion of the spring is submerged in the layer of waste. This pulling in of the spring results from the lower end of the spring becoming anchored in the waste while it is compressed and before it is re-expanded. This anchorage results in part from the lower convolution having been threaded into the waste, in part from a strand or two of the waste working into the eye through the slight unclosed gap thereof and anchoring themselves in the eye, and in part by the barb at the end of the severed end of the eye catching in some of the waste.

The fifth step in the cycle, which may largely overlap the fourth step, is a horizontal shifting of the layer of waste corresponding to the interval at which springs are to be embedded in the layer of waste. The completion of this fifth step is shown in Fig. 1.

This cycle may be simultaneously carried out in multiple at intervals transverse to the direction of shift of the layer of waste (that is, at intervals in a front-to-back line in Fig. 1), so that during each cycle a plurality of springs are completed and screwed into a layer of waste at intervals transversely thereof. Thus, with the completion of a plurality of cycles embedding springs at intervals longitudinally of the layer of waste, a large area of waste with springs embedded at longitudinal and transverse intervals is produced. This spring-embedded layer is then twisted and folded and matted together in such a manner as to form the spring-filled waste mass of Fig. 6, wherein the springs are rather uniformly distributed through the mass but not in any particular order or pattern.

Particular attention is called to the placement of the terminal eyes in reference to the helical bodies of the springs. If the planes of the eyes were more or less at normals to the axes of the helical spring bodies, the instrumentalities employed in turning the severed ends of the wire into the eyes would be confined to rather close quarters between convolutions. But by forming the eyes so that the plane of each eye is substantially a tangent to the imaginary cylindrical surface in which the helix of the body of the spring is inscribed, the axis of the eye becomes more or less a radius from the axis of the helical body of the spring. This gives us almost unlimited room radially outwardly from the axis of the helix, and along the axis of the eye, for the instrumentalities employed in turning the wire into the eye. The space between convolutions and the substantial gap left between the completed eyes also afford reasonable working space arcuately about the axes of the eyes for the instrumentalities which form them.

Any usual economical means for severing the wire will leave barbs at the severed ends. We so form the terminals of the springs that these barbs cannot have any objectionable results such as injuring the fingers of the workman or impeding the threading of the springs into the waste. But, on the other hand, we do retain the barbed ends of the wire and turn them to good use where they can be of service; namely, in engaging and sticking to strands of the waste, the better to anchor the springs in the waste without danger of dislodgment.

Our foregoing method is disclosed in greater detail in connection with a preferred die and other apparatus for effecting it, in our above-mentioned parent application Serial No. 382,374.

While we have illustrated and described this specific embodiment of our method, we contemplate that many changes and substitutions may be made without departing from the scope and spirit of our invention.

We claim:

1. The continuous method of making spring-filled packing, which consists in shifting a spring wire longitudinally of itself from a supply into the form of a helix and advancing the helix, as formed, longitudinally of its wire to screw the leading end of the helix into a layer of waste; then cutting the wire to sever leading convolutions of the helix as a coiled spring; then, while holding the severed and remaining parts of the helix in their pre-severed helical alignment, bending the ends of the wire adjoining the cut into small terminal eyes a little short of closed, thereby leaving gaps, opening into the eyes, too small to pass like wire but large enough to pass strands of the waste; and then releasing the severed spring and advancing the layer of waste to draw the severed spring, partially threaded therein, away from the remaining helix; and continuously repeating the foregoing series of operations on the wire and waste as cycles of the method.

2. The method of claim 1, which includes covering the completed springs with some of the waste, causing the spring eyes in general to receive through the gaps small numbers of strands of the waste, whereby to anchor the spring ends to local regions of the waste.

3. The method of claim 1 wherein, in forming the trailing terminal eye, the wire is bent backwardly from its severed spring, and in forming the leading terminal eye the wire is bent forwardly from its remaining helix.

4. The method of claim 1 wherein the layer of waste is compressed when the spring is screwed into it and subsequently allowed to expand, and wherein, in the course of the expansion, strands of the waste are, in general, drawn into the eyes through their gaps and retained by the eyes locally to anchor the spring terminals to the waste.

5. The continuous method of making spring filled packing which comprises shifting a spring wire longitudinally of itself from a supply into the form of a helix, and advancing the helix, as formed, to screw the leading end of the helix into a layer of waste, then cutting the wire at a point of the helix rearwardly of its forward convolution, then forming the leading end of the remaining wire reversely upon itself to form a waste-engaging eye, the eye being open an amount greater than the diameter of the strands of waste and less than the diameter of the wire forming the helix, then releasing the severed, previously eyed helix, and moving, relatively to each other, the waste with its screwed-in severed helix, and the remaining wire, to draw the severed helix away from the remaining wire, and continuously repeating the foregoing series of operations on the wire and waste as cycles of the method, whereby the leading end of each helix, together with its waste-engaging eye, is embedded in the waste.

6. The continuous method of making spring filled packing which comprises forming the end portion of a supply of spring wire into a helix, advancing the helix so formed rotatively around, and lengthwise of, its axis to screw the leading end of the helix into a supply of waste, forming a reversely bent eye in the helix, the eye being open an amount greater than the diameter of the strands of waste, and less than the diameter of the wire forming the helix, to receive and retain a few only of the strands of waste, thereby to resist movement of the helix in the waste, severing the helix rearwardly beyond the eye, moving the remaining wire relatively to the waste to draw the severed spring, partially threaded therein, away from the remaining wire, and continuously repeating the foregoing series of operations on the wire and waste as cycles of the method.

7. The continuous method of making spring filled waste packing which comprises forming an eye on an end of a wire helix, the eye being open an amount greater than the diameter of the strands of waste, and less than the diameter of the wire forming the helix, compressing a local area in a mass of waste, screwing the eye end of the helix into the compressed local area of waste, releasing the compressed local area of the waste mass from the compressive force, to draw the severed spring into the waste mass and to pass a few strands of the waste into the eye, and continuously repeating the foregoing series of operations as cycles of the method.

8. The continuous method of making spring filled packing which comprises forming the end portion of a supply of spring wire into a helix, advancing the helix so formed rotatively around, and lengthwise of, its axis to screw the leading end of the helix into a supply of waste, severing the helix so formed from the remaining spring wire, forming a reversely bent eye on the severed rear end of the helix, and simultaneously forming another such eye on the severed forward end of the remaining wire, each of the eyes being open a distance greater than the diameter of the strands of waste, and less than the diameter of the spring wire, each eye being formed to lie in a plane substantially parallel to the axis of the helix, whereby the forward eye will penetrate readily the waste during the screwing-in step of the process, moving the waste relatively to the supply of wire to separate the helix screwed into the waste from the remaining wire, and to draw a few strands of waste into the eye screwed into the waste, and continuously repeating the foregoing operations on the wire and waste as cycles of the method.

9. The method set forth in claim 8 where each eye is formed by turning the terminal spring wire portion outwardly from the helix, of which it forms an end, to lie in a plane substantially tangential to the imaginary cylinder defined by the helix, and perpendicular to a radius of that imaginary cylinder through the center of the eye, to facilitate the forming of said eyes with instrumentalities located radially almost wholly beyond the cylinder defined by the helix.

CHARLES T. RIPLEY.
WALTER M. GIBBS.